No. 852,762. PATENTED MAY 7, 1907.
G. E. BOHRER.
PIPE AND BOLT CUTTING MACHINE.
APPLICATION FILED OCT. 24, 1905.

2 SHEETS—SHEET 1.

Witnesses
Edwin Lewis
B. J. Gardner

Inventor
G. Edgar Bohrer
By Shepherd & Parker
Attorneys

No. 852,762. PATENTED MAY 7, 1907.
G. E. BOHRER.
PIPE AND BOLT CUTTING MACHINE.
APPLICATION FILED OCT. 24, 1905.
2 SHEETS—SHEET 2.
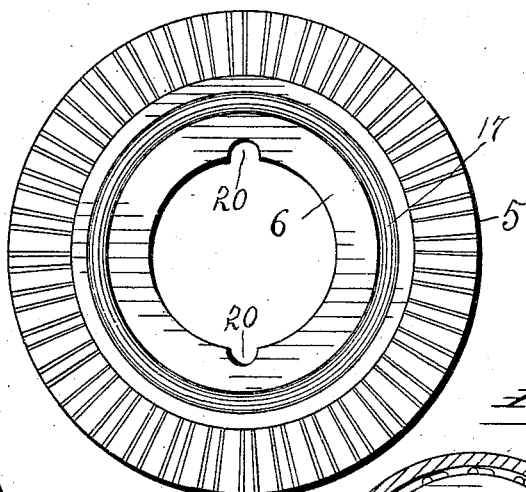
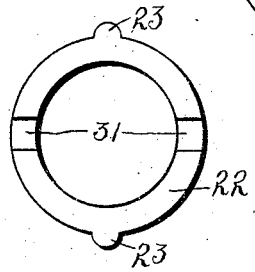
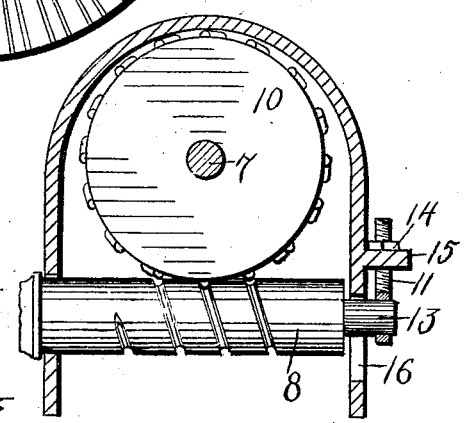
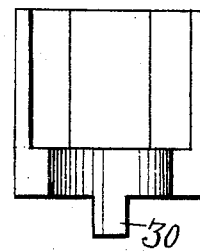
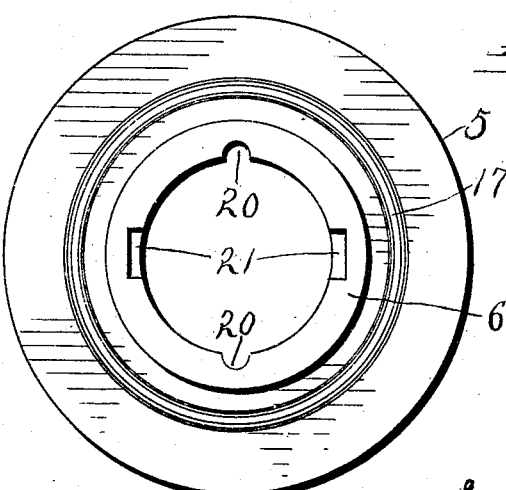
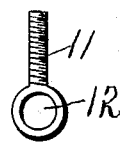
Witnesses
Edwin Lewis
B. J. Gardner.
Inventor
G. Edgar Bohrer
By Shepherd & Parker
Attorneys
THE NORRIS PETERS CO., WASHINGTON, D. C.

UNITED STATES PATENT OFFICE.

GODFREY EDGAR BOHRER, OF SOUTH BEND, WASHINGTON.

PIPE AND BOLT CUTTING MACHINE.

No. 852,762.     Specification of Letters Patent.     Patented May 7, 1907.

Application filed October 24, 1905. Serial No. 284,213.

*To all whom it may concern:*

Be it known that I, GODFREY EDGAR BOHRER, a citizen of the United States, residing at South Bend, in the county of Pacific and State of Washington, have invented certain new and useful Improvements in Pipe and Bolt Cutting Machines, of which the following is a specification.

This invention relates to a device for cutting threads in the surfaces of rods, bolts and tubes, and consists in certain peculiarities in the construction and arrangement of parts and in certain novel combinations of elements substantially as hereinafter described and particularly pointed out in the subjoined claims.

Figure 1:
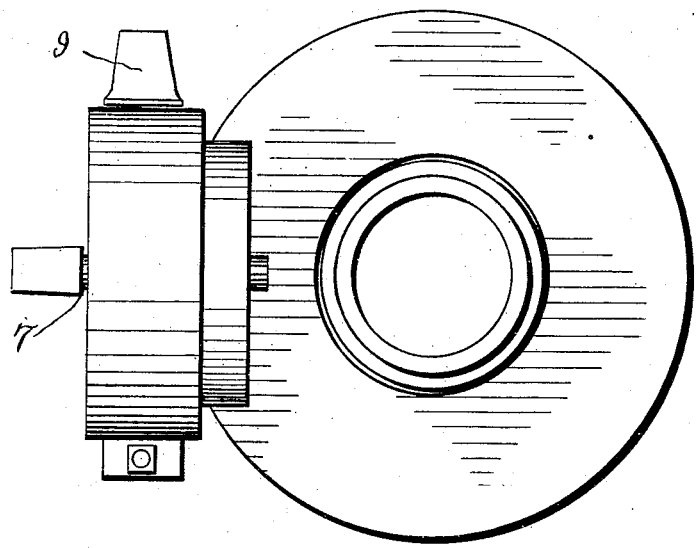
Figure 2:
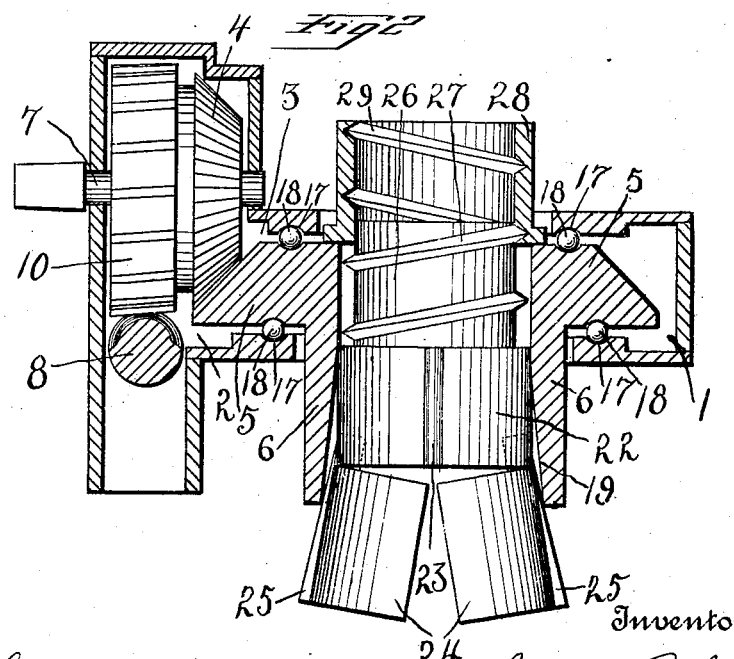

The object of the invention is to produce a device for the purposes stated which will have maximum efficiency. In pursuance of this object the device embraces a structure, which while exceedingly simple and durable, is capable of being operated with the greatest of ease, by hand. Moreover, provision is made for varying the speed which the main driving gear communicates to the threading tools, and, furthermore, provision is made for readily applying, removing or interchanging the thread cutters proper. These several features of the invention are embodied in the construction illustrated in the accompanying drawings, in which:

Figure 1 is an elevation of a threading device embracing my improvements. Fig. 2 is a longitudinal section through the same showing the chuck in elevation and open for the reception of a threading die. Fig. 3 is a rear elevation of the disk-gear and the chuck-sleeve carried thereby. Fig. 4 is a detail view showing the driving worm and its gear intermeshed. Fig. 5 is a detail view of the chuck sleeve and gear viewed from the side opposite that seen in Fig. 3. Fig. 6 is a detail view of the front end of the chuck body. Fig. 7 is a detail view of one of the chuck jaws, looking at the inner side thereof. Fig. 8 is a detail view of said jaw, viewed from the end, and Fig. 9 is a detail view of the eyebolt.

The same numerals of reference designate the same parts in the several figures.

The operating mechanism is preferably mounted in a casing suitably formed to provide two chambers 1 and 2 having communication with each other through an opening 3, and of which the chamber 2 is arranged at approximately right angles with the chamber 1. The members of said casing are suitably secured together by fastening means which permit separation thereof to give access to said chambers. Mounted in said chamber 2 is a bevel gear 4 which intermeshes with the bevel teeth of a gear disk 5, which is mounted in the chamber 1. Said disk has a diametrical aperture from which a sleeve 6 projects outwardly through an aperture in the side wall of said chamber 1 and said sleeve receives the die-gripping mechanism or chuck, presently described, and imparts revoluble movement thereto when said gear disk is revolved by the beveled gear 4. For imparting revoluble movement to the latter gear, at different speeds, two means are employed. In one of said means the movement is directly applied to the shaft 7 of said gear, a handle or other suitable means being connected with said shaft for said purpose: while the other means embraces speed-reducing gearing, which preferably comprises a worm 8, having an exposed angular end 9 to be engaged by a suitable operating handle, and a gear 10 fixed to move with said bevel gear 4, being preferably fixed on said shaft 7, and transmitting movement from said worm to the shaft 7, at reduced speed. Said worm is so mounted that it can be disconnected from said gear 10 when it is desired to operate the gear 4 by movement applied directly to said shaft 7. A convenient means for this purpose (see Fig. 4) comprises an eyebolt 11, the eye 12 of which receives the end of the worm shaft 13 and the stem of which bolt is threaded to be engaged by a holding or adjusting nut 14 and is adjustably mounted in a projection 15 from the casing, which casing is also formed with an elongated opening 16 for said shaft 13 to move in. Thus by slacking or tightening the nut 14 the worm shaft may be adjusted to or from said gear 10.

In order to reduce the power required to operate the device, the gear disk 5 and the inner walls of the chamber 1 are formed with confronting grooves 17 which constitute races at the opposite sides of said disk for lines of balls 18.

The sleeve 6, which is formed integral with or fixed to said disk 5, has an inwardly-contracted mouth or outer end 19 and its inner surface is formed with grooves 20, 20 which are preferably arranged diametrically opposite each other and may extend throughout the length of said sleeve. The forward end or mouth 19 of said sleeve also is formed at diametrically opposite places with grooves 21, 21 the depths of which gradually decrease from the extremity of the mouth 19 inward, as shown best in Fig. 5. Mounted in said sleeve is the tubular chuck-body 22 which is provided with keys or projections 23, 23 extending into said grooves 20, 20, and has its forward end provided with pivoted jaws 24, each of which has a wedge-shaped key or projection 25 to take in the contiguous groove 21. Thus, the revoluble movement of the gear disk 5 and its sleeve 6 is imparted to the chuck, while the latter may be moved longitudinally in said sleeve, inward to contract its jaws 24 upon a threading die inserted therebetween or outward to relax said jaws from said die. In order that said adjustment of the chuck may be most conveniently accomplished, its body is provided with a rearwardly-extending tubular portion 26 having a worm or other suitable thread 27, which is engaged by a collar 28, having corresponding threads 29, which collar is, preferably, suitably fixed against longitudinal movement and is accessible, so that it may be turned by hand or by a suitable tool and when so turned will move the chuck outward or inward from or into the sleeve according to the direction of the movement imparted to the collar. Said collar is preferably located in an aperture formed in the side wall of the casing and registered with the similar apertures in the disk 5 and the other wall of said casing.

Each chuck jaw 24 preferably has a rearward projection 30 inserted in a contiguous opening 31 in the front end of the chuck-body 22 and pivoted in said opening: and the inner surface of each jaw is preferably angular, as shown best at 32 in Figs. 7 and 8 and provided with a rear wall 33 to enable it effectually to grip and hold the threading die.

From the above it being, of course understood, that the rod, bolt or tube to be threaded will be inserted through the tubular chuck sleeve and collar and suitably clamped or held while the dies are rotated around the same to produce the desired threads thereon. It will also be seen that the device is very simple and durable in its construction and will enable the threads to be cut by hand with a minimum expenditure of power, and, further, that it provides for the ready renewal, insertion or interchangement of threading tools in the chuck and for the effective holding of said tools by said chuck. The device, therefore, answers all the requirements of a thread cutting device of high efficiency.

While the details of construction have been set forth with some degree of particularity, it will be apparent that this is not for the purpose of restricting the invention thereto, but is merely in order that what is at present regarded as the best form of the invention may be fully disclosed.

Having thus described the invention what I believe to be new and desire to secure by Letters Patent is:—

1. A thread cutting device, comprising an apertured toothed disk, a sleeve projecting from the apertured portion of said disk and adapted to receive a holding device for a thread cutter, a shaft adapted to an operating handle, a fixed gear on said shaft, intermeshed with the teeth of said disk, a second gear on said shaft, a worm adapted to intermesh with said second gear and having its shaft adapted to an operating handle, and means by which said worm may be disconnected from said second gear.

2. A thread cutting device, comprising a casing having communicating chambers arranged at right angles with each other, said casing also having apertures leading through its walls to one of said chambers, a disk arranged in the latter chamber and having an aperture registered with the apertures thereof, said disk being also provided with a sleeve which projects from its apertured portion into one of said apertures and has a gradually expanded mouth, a chuck keyed in said sleeve and provided with jaws adapted to contract in the inward movement of the chuck, a collar threaded upon said chuck and arranged in the aperture in the other wall of said casing, and means arranged in the other chamber of said casing for rotating said disk.

3. A thread cutting device comprising a casing formed with registering openings in its confronting walls, a gear in said casing, said gear being formed with a central bore and a central integral sleeve projected through one of said registering openings, collapsible chuck jaws mounted in said sleeve, means in said bore and projecting through the other of said registering openings for collapsing and expanding said chuck jaws in said bore, and means for rotating said gear.

In testimony whereof I affix my signature in presence of two witnesses.

GODFREY EDGAR BOHRER.

Witnesses:
 S. H. EICHNER,
 F. A. HAZELTINE.